Oct. 22, 1963  R. K. ARMSTRONG ET AL  3,107,613
BORON COMPOUND
Filed Feb. 17, 1961
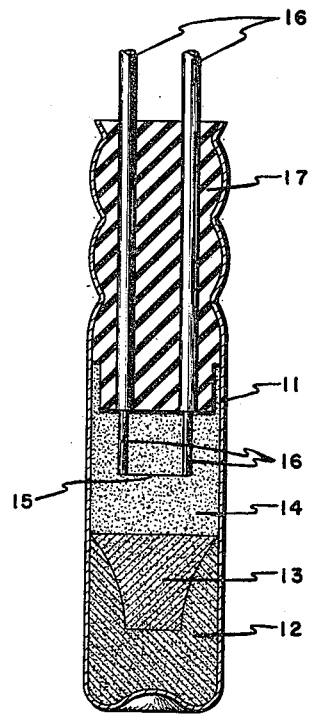
INVENTORS
ROBERT K. ARMSTRONG
DAVID C. ENGLAND
GEORGE W. PARSHALL
BY DONALD N. THATCHER
ATTORNEY 3,107,613
BORON COMPOUND
Robert K. Armstrong, Glassboro, N.J., David C. England, Wilmington, Del., George W. Parshall, London, England, and Donald N. Thatcher, Pitman, N.J., assignors to E. I. du Pont de Nemours and Company, Wilmington, Del., a corporation of Delaware
Filed Feb. 17, 1961, Ser. No. 90,143
7 Claims. (Cl. 102—28)

The present invention relates to a novel boron compound and to its preparation. More particularly this invention relates to a double salt of cesium nitrate and cesium decahydrodecaborate represented by the formula $CsNO_3 \cdot Cs_2B_{10}H_{10}$ (hereinafter sometimes referred to simply as the "double salt").

Conveniently, the double salt of this invention is prepared by reacting a boron hydride amine salt having the formula $(R_3NH)_2B_{10}H_{10}$, wherein R is hydrogen or a lower alkyl radical with a nitrate and a cesium salt, e.g. cesium nitrate, cesium carbonate, or cesium fluoride. The boron hydride amine salts can be prepared by reacting two moles of a primary, secondary, or tertiary alkyl amine or of ammonia with 1 mole of a decaboryl bis(alkyl sulfide), e.g. decaboryl bis(dimethyl sulfide) as described in detail in copending applications Serial No. 6,854 filed February 5, 1960 and Serial No. 6,853 filed February 5, 1960 in the name of W. H. Knoth, Jr. and assigned to the present assignee. The amine salt also can be prepared by refluxing $B_{10}H_{14}$ with a lower alkyl tertiary amine in benzene for several hours, cooling the mixture, adding acetone and filtering out the desired amine salt.

The preferred solvent system for use in preparing the double salt of cesium nitrate and cesium decahydrodecaborate is water. The double salt is insoluble in solvents such as lower alcohols, ketones, and the like. However, it is soluble in a more polar solvent such as water or acetic acid. For this reason, a binary solvent system may be desirable so that one component will maintain the unreacted ions in solution while the other component will effect precipitation of the product. Solvent systems which have been used include water with 95% ethanol, and acetic acid with 95% ethanol. However, the salt is stable at temperatures up to 420° C. and can be isolated from the reaction mass by simple evaporation of the solvent. The mode of recovering the double salt is not critical and will vary from case to case depending upon the other ions present in solution, the characteristics of the solvent used in its preparation, etc.

Alternatively, the double salt can be prepared by reacting a boron-containing acid represented as a hydronium compound, i.e., by the formula $(H_3O)_2B_{10}H_{10} \cdot (H_2O)_m$, where m is 0 or a positive integer with nitric acid and a cesium compound. The boron-containing acid may be prepared by treating, at temperatures between 0° C. and 100° C., an aqueous solution of a boron hydride amine salt having the formula $(R_3NH)_2B_{10}H_{10}$, where R is hydrogen or an alkyl radical, with an ion exchange resin capable of replacing the amine cations by hydrogen, e.g. a copolymer base of styrene cross-linked with divinylbenzene, sulfonated to introduce sulfonic acid groups into the aryl nucleus as polar groups. The boron-containing acid can be isolated from the aqueous effluent by evaporation of the water at elevated temperatures, e.g. 30–40° C., preferably under reduced pressure (0.1–5 mm. of mercury). A more detailed discussion of the preparation of the acid is disclosed in copending application Serial No. 6,855 filed February 5, 1960 in the name of W. H. Knoth, Jr. and assigned to the present assignee.

In preparing the double salt, aqueous solutions of the cesium salts are used in which the cesium is present to the extent of at least three equivalents of cesium per equivalent of the decahydrodecaboric acid.

The combination of the cesium, nitrate, and decahydrodecarborate ions to form the double salt occurs at room temperature (20–25° C.). When the double salt is prepared from the boron hydride amine salt, a water-soluble nitrate and a cesium salt, heating is desirable to drive off volatile compounds such as the free amine, ammonia, and carbon dioxide. The heating serves to effect more efficient recovery of the double salt from the reaction mass and to eliminate tedious separation of the double salt from other compounds which otherwise might be coprecipitated. At temperatures below 0° C. the mobility of the ions lessens so that the reaction rate is decreased and, additionally, recovery of the double salt from the reaction mass is more involved.

The double salt of this invention is stable indefinitely at room temperature. Surprisingly, it also is stable when heated without exposure to flame to temperatures up to 420° C. even though it ignites easily when held in an open flame.

Significant bands found in the infrared absorption spectrum of the double salt are very strong, conventional inorganic nitrate bands at 7.3 and 12.1 microns, absorption peaks with shifting at 9.55 and 9.80 microns, which bands are indicative of the $B_{10}H_{10}$ nucleus, and a splitting found at approximately 4.0 microns indicative of a disturbance in the B—H stretch, which disturbance demonstrates that a true molecular compound is formed.

The following examples in which parts are given by weight illustrate specific embodiments of the present invention.

*Example 1*

A solution of 6.4 parts of triethylammonium decahydrodecaborate and 1.7 parts of sodium nitrate in 50 parts of water was filtered and a solution of 9.8 parts of cesium carbonate in 30 parts of water was added to the filtrate. A precipitate formed, but, upon heating on a steam bath, it dissolved to form a clear solution. Ethanol (95%) was added to the hot solution until it became turbid, and the reaction mixture was cooled further in an ice bath. The cooled mixture was filtered and the residue dried. There was obtained 5.65 parts of white, fibrous solid which on analysis was shown to be $CsNO_3 \cdot Cs_2B_{10}H_{10}$.

*Analysis.*—Calculated for $Cs_3B_{10}H_{10}NO_3$: Cs, 68.9%; H, 1.74%; N, 2.42%. Found: Cs, 68.4%; H, 2.58%; N, 2.28%.

The infrared absorption spectrum obtained with this mixed salt was very clean and characterized by splitting at 4.0 microns and peaks at 7.3, 12.1, 9.55 and 9.80 microns. The mixed salt was differentiated from a simple mixture of its components by the X-ray diffraction pattern and by the infrared spectrum.

*Example 2*

A solution of 100 parts of triethylammonium decahydrodecaborate in 200 parts of water was prepared, and the resulting solution was filtered to remove a very small amount of insoluble material. A solution of 24.9 parts of NaOH in 100 parts of water was added to the filtrate. The mixture then was heated on a steam bath for 1.5 hours to drive off extraneous, easily vaporized materials such as the triethylamine displaced from the amine salt. A solution of 26.5 parts of sodium nitrate in 50 parts of water was added to the hot solution, and then a solution of 153.2 parts of cesium carbonate dissolved in 100 parts of water was added. After addition of 360 ml. of water, the mixture was filtered, and the residue dried in air. The residue consisted of 135.4 parts of the double salt of cesium nitrate and cesium decahydroborate. The identity of the product was confirmed by infrared analysis.

Example 3

To twenty-five parts of aqueous $(H_3O)_2B_{10}H_{10} \cdot (H_2O)_m$ containing 0.037 mole of acid was added 30 milliliters of acetic acid, and the mixture was cooled to approximately 3° C. One part of 96% nitric acid in 10 parts of acetic acid was added dropwise to the mixture. The resulting solution was stirred overnight while it came to room temperature. Upon neutralization of the solution with excess cesium carbonate, white needles of the $$CsNO_3 \cdot Cs_2B_{10}H_{10}$$

were formed which were subsequently filtered from the mother liquor, then recrystallized from 95% ethanol, and dried in air. The identity of the compound was confirmed by infrared and elemental analysis.

The double salt thus produced has several properties which make it very useful for use as an ignition agent in electric blasting caps. For example, in electric blasting caps to be used for certain special purposes, such as seismographic exploration, the accuracy of the work is dependent upon knowledge of the instant of detonation. At present, lead styphnate is a preferred composition for such uses because it is considered "fast." However, lead styphnate is known to be highly sensitive to ignition by discharges of static electricity and, accordingly, must be handled with extreme caution.

The double salt of cesium nitrate and cesium decahydrodecaborate has been found to be very insensitive to ignition by discharges of static electricity and, at the same time, to be ignitable with sufficient rapidity to meet the requirements of a "fast" ignition charge.

To evaluate the performance of the double salt of cesium nitrate and cesium decahydrodecaborate, electric blasting caps were prepared having the design illustrated in the accompanying drawing. Referring to the drawing, the electric blasting cap comprises a shell 11 having an integral closed end. Adjacent the end is loaded a base charge 12. Such base charge may consist of any explosive conventionally employed for such purposes, such as cyclotrimethylenetrinitramine, pentaerythritol tetranitrate, picric acid, trinitrotoluene, tetryl or mixtures thereof. Above base charge 12, is primer charge 13 which may be any of the primary explosives (highly sensitive to flame and/or shock) conventionally employed, e.g. lead azide or mercury fulminate. Above primer charge 13 is the loose igniting charge 14 which in this case consists of the double salt of cesium nitrate and cesium decahydrodecaborate. A bridgewire 15 connecting the terminals of lead wires 16 is embedded within the ignition composition 14. The shell 11 is sealed with rubber plug 17 which also holds the lead wires 16 firmly in position. Alternatively, other conventional shell sealing means may be substituted for the rubber plug 17.

Example 4

A series of electric blasting caps were assembled as illustrated in the attached drawing. The shell was of bronze and was 1⅛ inches long with an outer diameter of 0.272 inch and an average inner diameter of 0.26 inch. Into this shell was loaded approximately 4.9 grains of pentaerythritol tetranitrate pressed at 225–250 lbs. Immediately above this base charge, approximately 2.2 grains of lead azide was loaded and pressed at about 200 lbs. Two grains of the loose double salt of cesium nitrate and cesium decahydrodecaborate was inserted as the ignition charge. A conventional rubber plug assembly was inserted in which a 0.0019 inch diameter 80/20 nickel chromium bridge wire (resistance, 1.37±0.50Ω) was soldered to the lead wires separated to provide a ⅛ inch span and projecting ⅛ inch from the base of the rubber plug. The lead wires contained in the rubber plug were of 20 gage copper insulated by nylon. After the cap was loaded and the plug inserted, three peripheral crimps were made in the shell wall to seal the plug.

To test for static resistance, the lead wires of a thus assembled cap were twisted together and connected to the high voltage terminal of "leg-to-shell" static sensitivity apparatus consisting essentially of a source of variable voltage and a series of micromicrofarad condensers ranging in capacitance from 250–2000 $\mu\mu f.$; the shell of the cap was connected to a ground line. Voltages from 0 to 30,000 volts were applied to a condenser of known capacitance in increments of 1,000 volts and the condenser was allowed to discharge through the cap. The cap did not detonate at the upper limit of the machine, e.g. at voltages of 30,000 volts applied through a 2000 $\mu\mu f.$ condenser, indicating that the double salt has a static resistance greater than 77,500 man-equivalent volts (m.e.v.). When the cap was disconnected from the static testing apparatus and the lead wires connected in a conventional blasting circuit, ignition occurred within 0.082 millisecond with the passage of a 5 ampere (6.85 volts) firing current through the bridge wire of the cap.

Similar caps containing lead styphnate as the ignition charge customarily detonate in the static test when a potential of 4,000 volts is applied through a 2,000 $\mu\mu f.$ condenser indicating a static resistance of 9630 m.e.v., and the ignition time is approximately 0.3 millisecond, which is almost 4-fold longer than caps with the aforedescribed double salt.

Another important characteristic of the double salt of cesium nitrate and cesium decahydrodecaborate as an ignition charge is its stability at elevated temperatures. Although it is easily ignited by an incandescent resistance wire, an arc discharge, or an "exploding bridge wire," the salt has been found to be stable in the absence of flame up to its very high melting point. When the double salt was heated on a hot metal bar to temperatures up to 420° C., no evidence of decomposition was noted. The significance of this may be more readily appreciated by comparing it to lead styphnate which begins to vaporize at 100° C., with mercury fulminate which flashes at about 180° C., and with diazodinitrophenol which is more sensitive to heat than either lead styphnate or mercury fulminate. This ability to withstand high temperatures is a desirable characteristic for initiating explosives used in oil well perforating devices, in rocket applications, in tapping steel furnaces and other environments involving exposure to high temperature.

Squibs were also prepared using the double salt of cesium nitrate and cesium decahydrodecaborate. The shell and plug assembly including the bridge wire was identical to that described in Example 4 for the electric blasting cap, the only difference being that the detonating base charges and the priming charges were omitted and the charge weight for the double salt was increased to three grains. Squibs thus prepared fired satisfactorily at temperatures as low as −56.6° C. (imbedded in Dry Ice). In the vacuum firing test, a leak was simulated by providing a vent opening in the shell; satisfactory ignition occurred at the lowest pressure obtainable in the test apparatus, about 23 mm. of mercury. With a 5 ampere current, the squibs functioned in an average time of 0.96 millisecond; the minimum current required for initiation averaged 0.37 ampere. Black powder, aluminum/potassium perchlorate pellets, cannon powders, and a number of conventional rocket propellant compositions were ignited by means of these squibs, and in all cases the functioning was satisfactory.

Although our invention has been described with reference to specific embodiments thereof, the same are given by way of illustration only. Modifications and variations will be apparent from our description to those skilled in the art and may be made without departing from the spirit and scope of the invention.

We claim:

1. As a new composition of matter: $CsNO_3 \cdot Cs_2B_{10}H_{10}$.
2. A process for the preparation of the double salt of cesium nitrate and cesium decahydrodecaborate which comprises the steps of reacting in solution, a boron-containing compound selected from the group consisting of an acid represented by the formula $$(H_3O)_2B_{10}H_{10} \cdot (H_2O)_m$$

wherein $m$ is a whole number selected from the group 0 and positive integers and boron hydride amine salts of the formula $(R_3NH)_2B_{10}H_{10}$, wherein R is selected from the group consisting of hydrogen and alkyl groups having less than five carbon atoms, with a nitrogen compound selected from the group consisting of nitric acid and nitrates soluble in the reaction mixture and with a salt of cesium which is soluble in the reaction medium, and thereafter separating the resulting precipitate of the double salt of cesium nitrate and cesium decahydrodecaborate.

3. The process of claim 2, wherein the reaction medium is selected from the group consisting of water, water and ethanol, acetic acid, and acetic acid and ethanol.

4. The process of claim 2, wherein the boron-containing compound is triethylamine decahydrodecaborate.

5. An ignition composition comprising double salt of cesium nitrate and cesium decahydrodecaborate.

6. An electric initiator comprising a shell, an electric heating element within said shell, and a loose ignition composition in contact with said heating element, said composition comprising double salt of cesium nitrate and cesium decahydrodecaborate.

7. An electric initiator comprising a shell, an electric heating element within said shell, a loose ignition composition in contact with said heating element, said composition comprising the double salt of cesium nitrate and cesium decahydrodecaborate, a lead azide initiator charge adjacent the initiator charge, and a base charge selected from the group of explosives consisting of cyclomethylenetrinitroamine, trinitrotoluene, ethylenedinitraamine, picric acid, and tetryl adjacent said initiator charge on the side of the latter remote from the ignition composition.

References Cited in the file of this patent
UNITED STATES PATENTS

| | | |
|---|---|---|
| 2,715,561 | Knotz | Aug. 16, 1955 |
| 2,837,400 | Blumenthal | June 3, 1958 |
| 2,953,447 | Schulz | Sept. 20, 1960 |
| 2,976,136 | Heiskell | Mar. 21, 1961 |